(No Model.)

G. N. BALL.
FARM GATE.

No. 398,998. Patented Mar. 5, 1889.

Witnesses:
P. M. Hulbert
John Schuman

Inventor:
George N. Ball
By Thos. S. Sprague & Son
Att'y.

UNITED STATES PATENT OFFICE.

GEORGE N. BALL, OF ARGENTINE, MICHIGAN.

FARM-GATE.

SPECIFICATION forming part of Letters Patent No. 398,998, dated March 5, 1889.

Application filed April 20, 1888. Serial No. 271,329. (No model.)

*To all whom it may concern:*

Be it known that I, GEORGE N. BALL, a citizen of the United States, residing at Argentine, in the county of Genesee and State of Michigan, have invented certain new and useful Improvements in Farm-Gates, of which the following is a specification, reference being had therein to the accompanying drawings.

This invention relates to certain new and useful improvements in farm-gates; and the invention consists in the peculiar construction, arrangement, and combination of the various parts, all as more fully hereinafter set forth.

Figure 1:
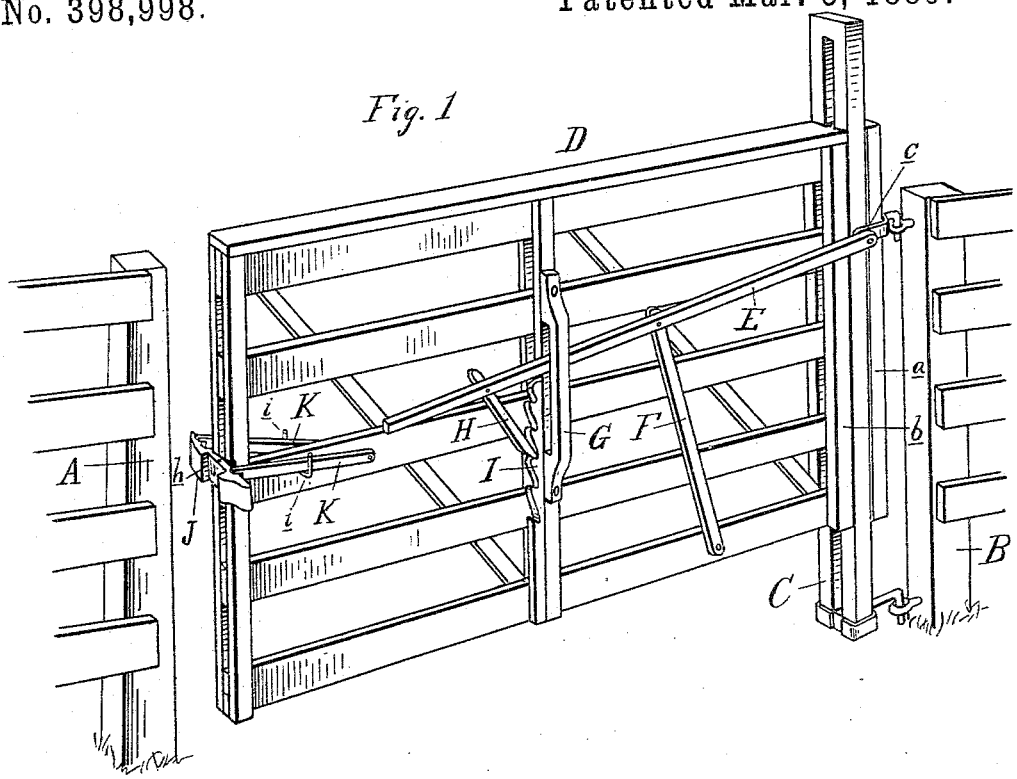
Figure 2:
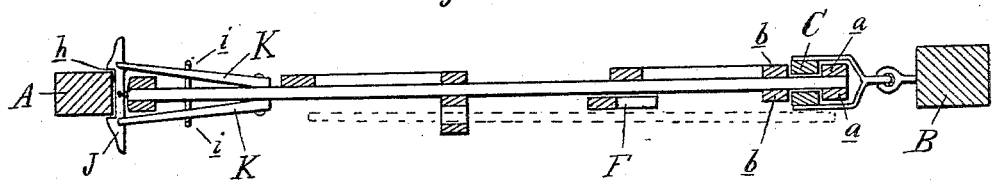

Figure 1 is a perspective view of my improved gate. Fig. 2 is a central horizontal section.

In the accompanying drawings, which form a part of this specification, A represents the latch-post, and B, the hinge-post. To the latter is hinged the standard C of the gate. This standard is slotted the greater portion of its length, as shown, and through this slot the rear end of the gate D projects, and has secured to it the vertical bars or stiles $a$, while other vertical bars, $b$, are secured to the gate in front of the standard C, the two sets of bars $a$ $b$ acting as guides for the gate in its vertical adjustability, while they also retain the gate in its intended upright position. The upper hinge, $c$, is clevis-shaped, so as to embrace and be secured to the two edges of the standard C, while it also allows the gate to move freely through it as the gate is adjusted to its various vertical positions. When the gate is in its lowest position, it rests upon and is supported by the lower hinge.

E is a lever, one end of which is pivotally secured to the hinged standard, preferably at the hinge $c$, and at or about its longitudinal center it is likewise pivotally connected to the upper end of a bar, F, the lower end of which latter is pivoted to the lower bar of the gate. The free end of this lever E passes through a guide-bracket, G, and is provided with a dog, H, which is designed to engage with a notched bar, I, secured to the gate, as shown.

From this construction and arrangement of parts it will be seen that by raising the free end of the lever the gate can readily be raised vertically, its rear end sliding up in the slotted standard, and that it can be secured in such elevated position by engaging the dog H with one of the notches of the bar I, and thus leave sufficient space below the gate to allow small animals to pass beneath it, while it will prevent the passage of the larger animals. It will also be seen that the gate, when in any of its positions, is free to be swung open upon its hinges in either direction.

J is a latch having inclines at both ends, which is pivotally secured in a horizontal position transversely across the free end of the gate, and is provided with a central recess or notch, $h$, to engage with the post A.

K K are two latch-bars pivotally secured at their rear ends to the gate, their free ends being notched, as shown, to engage with the upper edge of the latch J, and to prevent their accidentally dropping down a suitable bracket, $i$, is secured beneath them, projecting laterally from the gate.

To open the gate, lift up one of the bars K and then turn the latch back upon its pivot, so that the raised bar will rest upon it back of its notch. The gate can now be swung open, the operator pushing the gate from him. Upon pushing the gate shut the latch J will come in contact with the post A and will be compelled (automatically) to assume its original position, its notch engaging with the post, while the latch-bar K will drop and its notch engage with the latch J and thus lock the gate closed.

What I claim as my invention is—

1. In a farm-gate, the combination of a post to which is hinged a slotted standard, a gate sliding vertically in said slotted standard, and a lever pivotally connected to the gate and standard, said lever being provided with a pivoted dog engaging a racked bar on the gate, substantially as and for the purposes described.

2. In a farm-gate, the combination, with the posts A B, of slotted standard C, hinged to the post B, gate D, sliding vertically in said slotted standard, lever E, pivoted at one end to the standard, bar F, connecting said lever with the gate, dog H, pivoted to said lever and arranged to engage with a notched bar, I, secured to the gate, latch J, pivoted to the free end of the gate, and latch-bars K, the parts being constructed, arranged, and operating substantially in the manner and for the purposes specified.

In testimony whereof I affix my signature, in presence of two witnesses, this 10th day of March, 1888.

GEORGE N. BALL.

Witnesses:
  FRED. H. PRATT,
  JOHN S. ELIOT.